United States Patent
Chun et al.

(10) Patent No.: US 8,027,363 B2
(45) Date of Patent: Sep. 27, 2011

(54) METHOD OF TRANSMITTING DATA IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 17 days.

(21) Appl. No.: 12/451,171

(22) PCT Filed: Apr. 30, 2008

(86) PCT No.: PCT/KR2008/002457
§ 371 (c)(1),
(2), (4) Date: Oct. 29, 2009

(87) PCT Pub. No.: WO2008/133478
PCT Pub. Date: Nov. 6, 2008

(65) Prior Publication Data
US 2010/0118889 A1      May 13, 2010

Related U.S. Application Data

(60) Provisional application No. 60/915,042, filed on Apr. 30, 2007, provisional application No. 60/915,417, filed on May 1, 2007.

(30) Foreign Application Priority Data

Apr. 30, 2008 (KR) .................. 10-2008-0040508

(51) Int. Cl.
*H04J 3/16* (2006.01)

(52) U.S. Cl. ........................................ 370/469; 370/466
(58) Field of Classification Search .......... 370/469–479, 370/82–83, 395.1–395.7
See application file for complete search history.

(56) References Cited

U.S. PATENT DOCUMENTS

| | | | |
|---|---|---|---|
| 6,157,833 | A | 12/2000 | Lawson-Jenkins et al. |
| 6,324,171 | B1 | 11/2001 | Lee et al. |
| 6,353,628 | B1 | 3/2002 | Wallace et al. |

(Continued)

FOREIGN PATENT DOCUMENTS

EP          1 148 753        10/2001

(Continued)

OTHER PUBLICATIONS

LG Electronics Inc: "PDCP retransmissions" 3GPP Draft; R2-073041 PDCP Retransmissions_V2, Aug. 16, 2007, XP050135778.

(Continued)

*Primary Examiner* — Pao Sinkantarakorn
*Assistant Examiner* — Iqbal Zaidi
(74) *Attorney, Agent, or Firm* — McKenna Long & Aldridge LLP

(57) ABSTRACT

A method of configuring a lower layer data block in a protocol layer of a transmitting side of a wireless communication system comprises receiving upper layer data from an upper layer, and configuring a second lower layer data block to include a first upper layer data block comprising at least part of the upper layer data, and a size change indictor indicating whether a size of the first upper layer data block is identical with a size of a second upper layer data block included in a first lower layer data block.

11 Claims, 7 Drawing Sheets

U.S. PATENT DOCUMENTS

| | | | |
|---|---|---|---|
| 6,526,027 | B1 | 2/2003 | Yeom |
| 6,567,409 | B1 | 5/2003 | Tozaki et al. |
| 6,725,267 | B1 | 4/2004 | Hoang |
| 7,197,317 | B2 | 3/2007 | Parkvall et al. |
| 7,245,707 | B1 | 7/2007 | Chan |
| 7,551,643 | B2 | 6/2009 | Yeo et al. |
| 2001/0017850 | A1 | 8/2001 | Kalliokulju et al. |
| 2001/0044322 | A1 | 11/2001 | Raaf |
| 2002/0024972 | A1 | 2/2002 | Yi et al. |
| 2002/0028690 | A1 | 3/2002 | McKenna et al. |
| 2002/0057663 | A1 | 5/2002 | Lim |
| 2003/0007512 | A1 | 1/2003 | Tourunen et al. |
| 2003/0123485 | A1 | 7/2003 | Yi et al. |
| 2003/0165133 | A1 | 9/2003 | Garani |
| 2003/0189922 | A1 | 10/2003 | Howe |
| 2003/0207696 | A1 | 11/2003 | Willenegger et al. |
| 2004/0014452 | A1 | 1/2004 | Lim et al. |
| 2004/0028078 | A1 | 2/2004 | Beckmann et al. |
| 2004/0117860 | A1 | 6/2004 | Yi et al. |
| 2004/0121771 | A1 | 6/2004 | Song et al. |
| 2004/0253959 | A1 | 12/2004 | Hwang et al. |
| 2005/0041610 | A1 | 2/2005 | Lee et al. |
| 2005/0041681 | A1 | 2/2005 | Lee et al. |
| 2005/0085254 | A1 | 4/2005 | Chuah et al. |
| 2005/0094670 | A1 | 5/2005 | Kim |
| 2005/0141462 | A1 | 6/2005 | Aerrabotu et al. |
| 2005/0176474 | A1 | 8/2005 | Lee et al. |
| 2005/0185620 | A1 | 8/2005 | Lee et al. |
| 2005/0232271 | A1 | 10/2005 | Kettunen et al. |
| 2005/0238051 | A1 | 10/2005 | Yi et al. |
| 2006/0067324 | A1 | 3/2006 | Kim et al. |
| 2006/0067364 | A1* | 3/2006 | Jung et al. ............... 370/469 |
| 2006/0087994 | A1 | 4/2006 | Barth et al. |
| 2006/0126554 | A1 | 6/2006 | Motegi et al. |
| 2006/0165045 | A1 | 7/2006 | Kim et al. |
| 2006/0209870 | A1 | 9/2006 | Lee et al. |
| 2006/0245417 | A1 | 11/2006 | Conner et al. |
| 2007/0047582 | A1* | 3/2007 | Malkamaki ............... 370/470 |
| 2007/0060139 | A1 | 3/2007 | Kim et al. |
| 2007/0165567 | A1 | 7/2007 | Tan et al. |
| 2007/0177569 | A1 | 8/2007 | Lundby |
| 2007/0178875 | A1 | 8/2007 | Rao et al. |
| 2007/0206531 | A1 | 9/2007 | Pajukoski et al. |
| 2007/0248075 | A1 | 10/2007 | Liu et al. |
| 2007/0258591 | A1 | 11/2007 | Terry et al. |
| 2007/0291673 | A1 | 12/2007 | Demirhen et al. |
| 2007/0291719 | A1 | 12/2007 | Demirhan et al. |
| 2007/0291728 | A1 | 12/2007 | Dalsgaard et al. |
| 2007/0291729 | A1 | 12/2007 | Dalsgaard et al. |
| 2008/0043619 | A1 | 2/2008 | Sammour et al. |
| 2008/0056198 | A1 | 3/2008 | Charpentier et al. |
| 2008/0056273 | A1 | 3/2008 | Pelletier et al. |
| 2008/0101268 | A1 | 5/2008 | Sammour et al. |
| 2008/0167089 | A1 | 7/2008 | Suzuki et al. |
| 2008/0181127 | A1 | 7/2008 | Terry et al. |
| 2008/0273610 | A1 | 11/2008 | Malladi et al. |

FOREIGN PATENT DOCUMENTS

| | | |
|---|---|---|
| EP | 1 168 877 | 1/2002 |
| EP | 1 209 938 | 5/2002 |
| EP | 1 304 898 | 4/2003 |
| EP | 1 315 356 | 5/2003 |
| EP | 1 318 632 | 6/2003 |
| EP | 1337124 A2 | 8/2003 |
| EP | 1 372 310 | 12/2003 |
| EP | 1 420 551 | 5/2004 |
| EP | 1 501 328 | 1/2005 |
| EP | 1 511 245 | 3/2005 |
| EP | 1 720 373 | 11/2006 |
| EP | 1720322 A1 | 11/2006 |
| EP | 1932380 | 6/2008 |
| JP | 2002-539686 | 11/2002 |
| JP | 2003-504935 | 2/2003 |
| JP | 2005-354488 | 12/2005 |
| JP | 2006-505979 | 2/2006 |
| JP | 2006-067115 | 3/2006 |
| KR | 10-2004-0039944 | 5/2004 |
| KR | 10-2004-0048675 | 6/2004 |
| KR | 10-2001-0105240 | 11/2004 |
| KR | 10-2005-0008440 | 1/2005 |
| KR | 10-2005-0027975 | 3/2005 |
| KR | 10-2005-0096763 | 10/2005 |
| RU | 2249917 C2 | 4/2005 |
| WO | WO 00/74416 | 12/2000 |
| WO | WO 2004/043094 | 5/2004 |
| WO | WO 2004/064272 | 7/2004 |
| WO | WO 2005/048613 | 5/2005 |
| WO | WO 2006/049441 A1 | 5/2006 |
| WO | WO 2006/075820 A1 | 7/2006 |
| WO | WO 2006/104344 | 10/2006 |
| WO | WO 2006/109851 | 10/2006 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO 2008/111684 A1 | 9/2008 |
| WO | WO 2009/084998 | 7/2009 |

OTHER PUBLICATIONS

LG Electronics Inc: "Contents of PDCP Status Report R2-07xxxx", 3GPP TSG-RAN WG2, 59, Oct. 8, 2007, pp. 1-3, XP002580785.

"PDCP Structure and Traffic Path" 3GPP Draft; R2-073259, Aug. 16, 2007, XP050135985.

Asustek: "Granularity Consideration for Variable RLC PDUsizes"; R2-070336, XP050133423.

"3GPP; Technical Specification Group Raido Access Network; Medium Access control (MAC) protocol specification (Release 7)"; XP050367709.

BOSCH: "Header Compression Signalling" 3GPP Draft; XP050114120.

3GPP Generation Partnership Project; 3Gpp Standard; 3Gpp TS 25.323, XP050367856.

Youjun Gao et al: "Research on the access network and MAC technique for beyond 3G systems" IEEE Wireless Communications, IEEE Service Center, Piscataway, NJ, US, vol. 14, No. 2, Apr. 1, 2007, pp. 57-61, XPO11184637 ISSN: 1536-1284.

XP002460800; Alcatel-Lucent: "Downlink Control Signaling and Multiplexing for VOIP, R1-071721" Jun. 26, 2007, pp. 1-4.

XP002602993; Nokia Corporation, Nokia Siemens Networks: "MAC header format, R2-073891", 3GPP TSG_RAN WG2 meeting 59bis, Oct. 1, 2007.

XP050134474; LG Electronics Inc: "Support for VoIP over MAC-hsEHS" 3GPP Draft; R2-071542, Apr. 2, 2007.

Panasonic; "MAC PDU format for LTE", 3GPP TSG RAN WG2 #56bis, R2-070096, Jan. 2007.

Nokia; "Requirements for redirection in E-UTRAN", 3GPP TSG-RAN WG2 Meeting #56-bis, R2-070107, Jan. 2007.

LG Electronics; "Relative Buffer Status Reporting", 3GPP TSG-RAN WG2 meeting #46bis, R2-050852, Apr. 2005.

IPWireless; "Layer 2 functions for LTE", 3GPP TSG RAN WG2 #48bis, R2-052377, Oct. 2005.

Samsung; "Selective forwarding/retransmission during HO", 3GPP TSG-RAN2 Meeting #56bish, R2-070130, Jan. 2007.

Samsung; "Re-use of PDCP SN at ARQ level?", 3GPP TSG-RAN2 Meeting #53bis, R2-061829, Jun. 2006.

Sammour et al., U.S. Appl. No. 60/863,185.

LG Electronics: "UL Timing Control related to Contention Resolution", 3GPP TSG-RAN WG2 #61 bis, Shenzhen, China, Mar. 31-Apr. 4, 2008, R2-081607, XP050139334.

3rd Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.

Ntt Docomo et al: "MAC PD U structure for LTE", 3GPP TSG RAN WG2 #56bis, R2-070280, Jan. 2007, XP050133369.

Catt et al: "Enhancement to Buffer Status Reporting", 3GPP TSG-RAN WG2 #57bis, R2-071345, Mar. 2007, XP050134291.

Nokia: "Active Mode DRX", 3GPP TSG-RAN WG2 Meeting #55, Seoul, Korea, Oct. 9-11, 2006, R2-062752.

NTT DoCoMo, Inc.: "Views on DRX/DTX control in LTE", 3GPP TSG RAN WG2 #56, Riga, Lativa, Nov. 6-10, 2006, R2-063397.

Email Rapporteur (Nokia): "DRX in E-UTRAN", 3GPP TSG-RAN WG2 Meeting #57, St. Louis, Missouri, Feb. 12-16, 2007, R2-070463.

* cited by examiner

METHOD OF TRANSMITTING DATA IN A WIRELESS COMMUNICATION SYSTEM

This application claims priority to International Application No. PCT/KR2008/002457 filed on Apr. 30, 2008, which claims priority to Provisional Application Nos. 60/915,042 filed on Apr. 30, 2007, 60/915,417 filed on May 1, 2007 and Korean Patent Application No. 10-2008-0040508 filed on Apr. 30, 2008, all of which are incorporated by reference for all purposes as if fully set forth herein.

TECHNICAL FIELD

The present invention relates to a wireless communication system, and more particularly, to a method of transmitting data in a wireless communication system.

BACKGROUND ART

FIG. 1 illustrates a network structure of an E-UMTS (Evolved-Universal Mobile Telecommunications System). An E-UMTS is a system evolving from the conventional WCDMA (wideband code division multiple access) UMTS and its basic standardization is currently handled by the 3GPP (3$^{rd}$ Generation Partnership Project). The E-UMTS can also be called an LTE (Long Term Evolution) system.

Referring to FIG. 1, an E-UTRAN (UMTS terrestrial radio access network) includes base stations (hereinafter, referred to as 'eNode B' or 'eNB'), wherein the respective eNBs are connected with each other through X2 interface. Also, each of eNBs is connected with a user equipment (UE) through a radio interface and connected with an EPC (Evolved Packet Core) through S1 interface. The EPC includes MME/SAE gateway (Mobility Management Entity/System Architecture Evolution gateway).

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the UE and the network. For this, the RRC layer enables RRC messages to be exchanged between the UE and the network. The RRC layer may distributively be located at network nodes including Node B, an AG and the like, or may independently be located at either the Node B or the AG.

FIG. 2 is a schematic view illustrating an E-UTRAN (UMTS terrestrial radio access network). In FIG. 2, a hatching part represents functional entities of a user plane and a non-hatching part represents functional entities of a control plane.

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via a transport channel. Data are transferred between the medium access control layer and the physical layer via the transport channel. Moreover, data are transferred between different physical layers, and more particularly, between one physical layer of a transmitting side and the other physical layer of a receiving side via the physical channel. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via a logical channel. The RLC layer of the second layer supports reliable data transfer. In order to effectively transmit IP packets (e.g., IPv4 or IPv6) within a radio-communication period having a relatively narrow bandwidth, a PDCP layer of the second layer (L2) performs header compression to reduce unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

In the aforementioned protocol layer structure, a data processing method in a specific layer, for example, MAC layer will be described below. The MAC layer receives an upper layer data block (i.e., RLC PDU: RLC protocol data unit) from its upper layer, i.e., RLC layer through the logical channel to configure a lower layer data block (i.e., MAC PDU) according to MAC layer protocol. The lower layer data block includes at least one MAC SDU (Service Data Unit) and header, which include a part or all of the data upper layer blocks. The header means control information related to at least one MAC SDU included in the MAC PDU, and includes information (LCID: Logical Channel Identifier) indicating a logical channel to which a corresponding MAC SDU is transferred, and a length field indicating a length of the corresponding MAC SDU.

The length field included in the header can be comprised of 7 bits or 15 bits. For example, considering that one length field is allocated per MAC SDU having a size of 100 bits to 200 bits, voice packets occupy a considerable part in one MAC PDU, thereby causing channel resources to be wasted in the overall system. In particular, if data of a constant size are generated at a constant time interval, such as voice packets or MBMS (Multicast and Broadcasting Multimedia Service) packets, a length field of 7 bits or 15 bits is allocated per MAC SDU. In this case, a problem occurs in that overhead may be caused in the system.

DISCLOSURE OF THE INVENTION

Accordingly, the present invention is directed to a method of transmitting data in a wireless communication system, which substantially obviates one or more problems due to limitations and disadvantages of the related art. An object of the present invention is to provide a method of transmitting data in a wireless communication system, in which radio resources can be used efficiently.

To achieve these objects and other advantages and in accordance with the purpose of the invention, as embodied and broadly described herein, a method of configuring a lower layer data block in a protocol layer of a transmitting side in a wireless communication system comprises receiving upper layer data from an upper layer, and configuring a second lower layer data block to include a first upper layer data block comprising at least part of the upper layer data, and a size change indictor indicating whether a size of the first upper layer data block is identical with a size of a second upper layer data block included in a first lower layer data block.

In another aspect of the present invention, a method of generating a lower layer data block in a protocol layer of a transmitting side in a wireless communication system comprises generating a first lower layer data block which includes a first upper layer data block, and a first length field indicating a size of the first upper layer data block, and generating a second lower layer data block which includes a second upper layer data block, and a size change indictor indicating whether a size of the second upper layer data block is identical with a size of the first upper layer data block.

In still another aspect of the present invention, a method of transmitting data from a transmitting side of a wireless communication system to a receiving side comprises transmitting a first lower layer data block to the receiving side, the first lower layer data block including a first upper layer data block and a first length field indicating a size of the first upper layer data block, and transmitting a second lower layer data block to the receiving side, the second lower layer data block including a second upper layer data block and a size change indictor indicating whether a size of the second upper layer data block is identical with a size of the first upper layer data block.

In further still another aspect of the present invention, a structure of a lower layer data block generated in a protocol layer of a transmitting side in a wireless communication system comprises a first upper layer data block, and a size change indictor indicating whether a size of the first upper layer data block is identical with a size of a second upper layer data block included in a first lower layer data block previously generated.

BRIEF DESCRIPTION OF THE DRAWINGS

FIG. 3A and FIG. 3B illustrate a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings.

Figure 1:
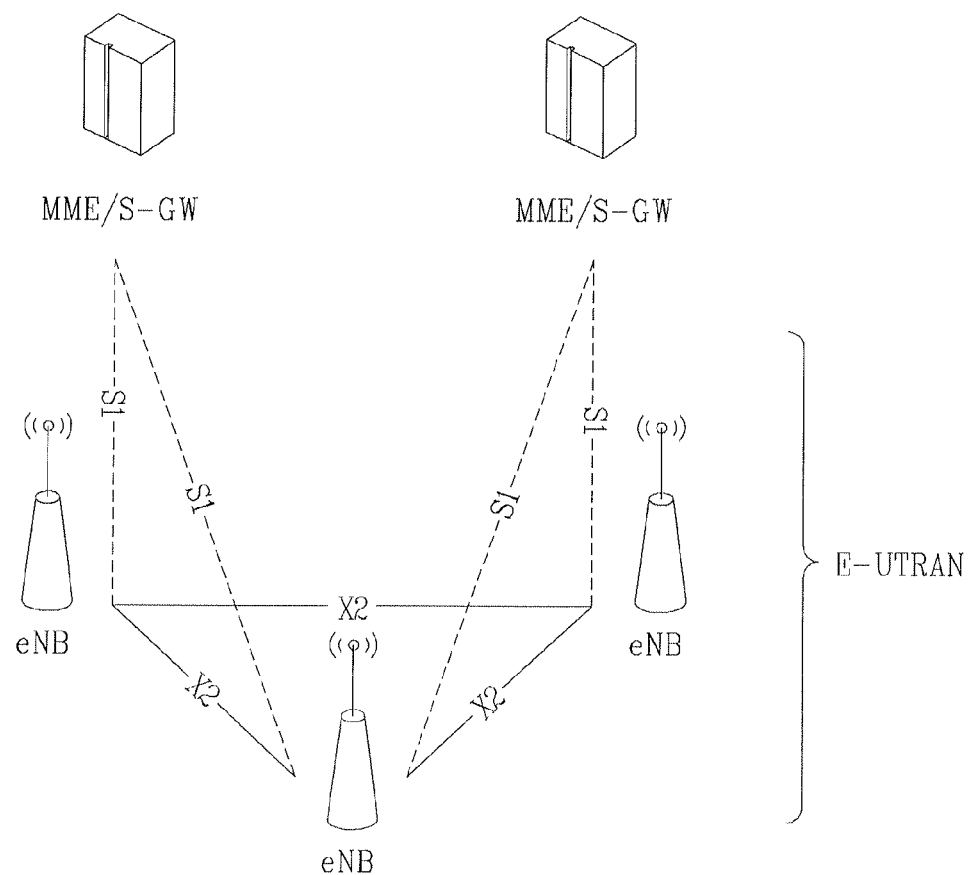
FIG. 1 is a diagram illustrating a network structure of an E-UMTS (Evolved-Universal Mobile Telecommunications System)
Figure 2:
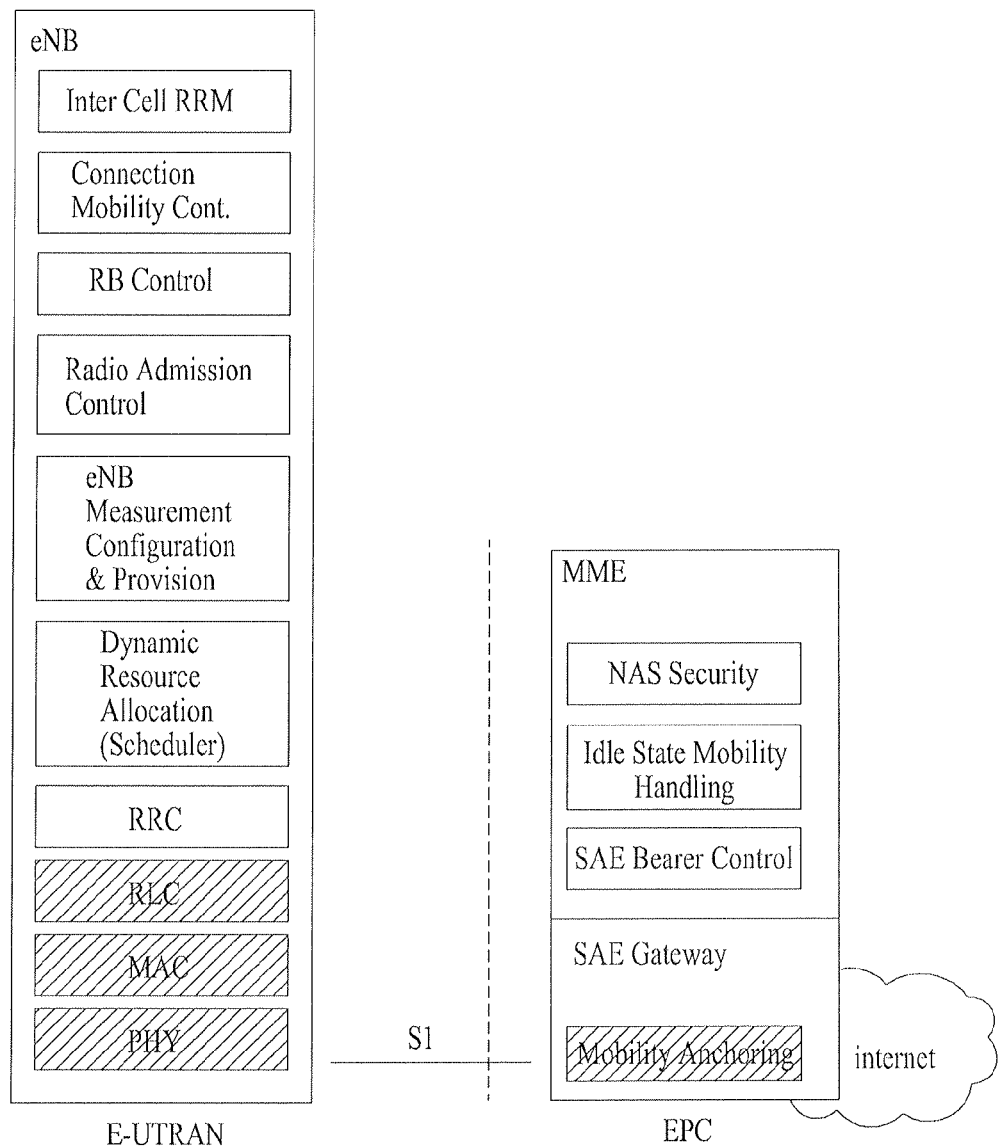
FIG. 2 is a schematic view illustrating an E-UTRAN (UMTS terrestrial radio access network)
Figure 3A:
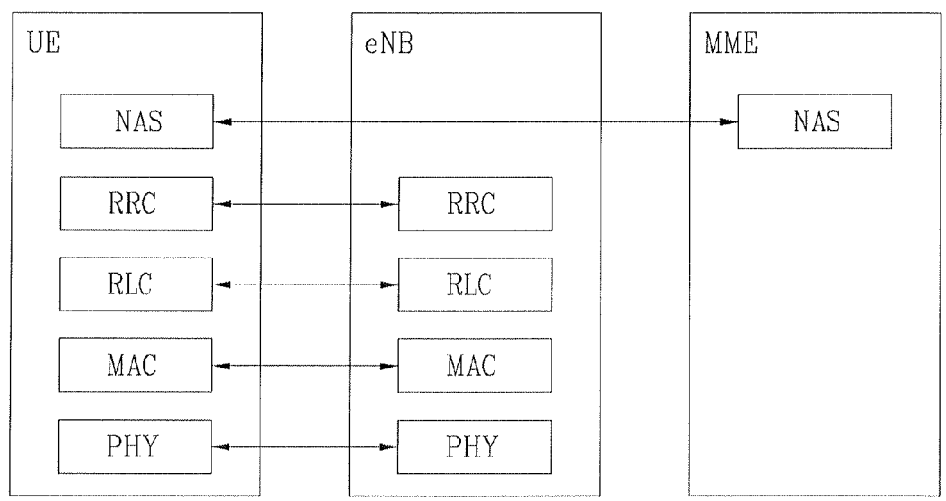
Figure 3B:
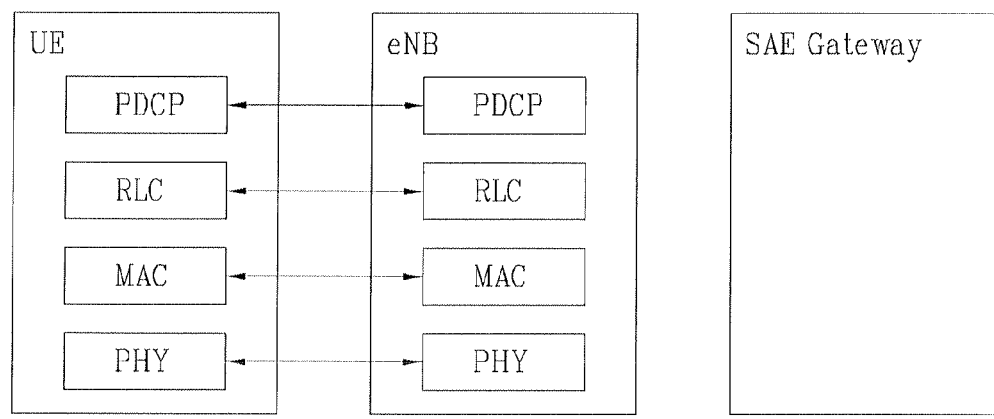
Figure 4:
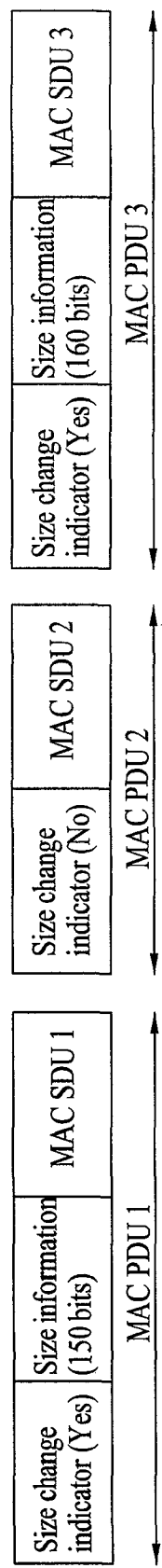
FIG. 4 is a diagram illustrating a structure of data blocks according to one embodiment of the present invention.

FIG. 4 illustrates a structure of data blocks according to one embodiment of the present invention.

Referring to FIG. 4, MAC PDU 1 includes a size change indicator, size information, and MAC SDU 1. The size change indicator indicates whether a size (or length) of the MAC SDU 1 is identical with that of a corresponding MAC SDU previously generated in MAC layer of a transmitting side and transmitted to a receiving side, wherein the MAC SDU is included in MAC PDU. The size information means information indicating the size of the MAC SDU 1 if the size change indicator indicates that the size of the MAC SDU 1 has been changed in comparison with that of the previous MAC SDU. The MAC SDU 1 is an upper layer data block transferred from an RLC layer, which is an upper layer of the MAC layer, through a logical channel. Namely, the MAC SDU 1 is a data block which includes the entire or a part of RLC PDU. In the MAC PDU 1, the size change indicator indicates that the size of the MAC SDU 1 has been changed ('Yes'), and the size information indicates 150 bits corresponding to an actual size of the MAC SDU 1.

In FIG. 4, MAC PDU 2 includes a size change indicator and MAC SDU 2. On the other hand, the MAC PDU 2 does not include size information of the MAC SDU 2. This is because that the receiving side can easily know from a length change indicator included in the MAC PDU 2 that the size of the MAC SDU 2 is identical with that of the MAC SDU 1 as the size change indicator included in the MAC PDU 2 indicates that the size of the MAC SDU 2 has not been changed ('No') in comparison with that of the MAC SDU 1 previously generated and included in the MAC PDU 1. As size information is omitted in the MAC PDU 2, overhead can be reduced, whereby channel resources can be used efficiently in view of the system. In other words, since the size change indicator can be expressed by 1 bit, it needs smaller channel resources for data processing and data transmission and reception than the size information which occupies 7 bits or 15 bits.

MAC PDU 3 includes a size change indicator, size information, and MAC SDU 3, in the same manner as the MAC PDU 1. Since a size of the MAC SDU 3 included in the MAC PDU 3 is different from that of the MAC SDU 2 included in the MAC PDU 2, the size change indicator included in the MAC PDU 3 is set to 'Yes' and size information indicating an actual size (160 bits) is required to indicate the actual size of the MAC SDU 3.

In each MAC PDU illustrated in FIG. 4, the size change indicator and the size information can be included in a header of the MAC PDU, and the MAC SDU can be included in a body of the MAC PDU. Also, a structure of each MAC PDU is schematically illustrated in FIG. 4 for convenience of description. The header of each MAC PDU or another part of the body can further include control information according to MAC layer protocol and a plurality of MAC SDUs.

Figure 5A:
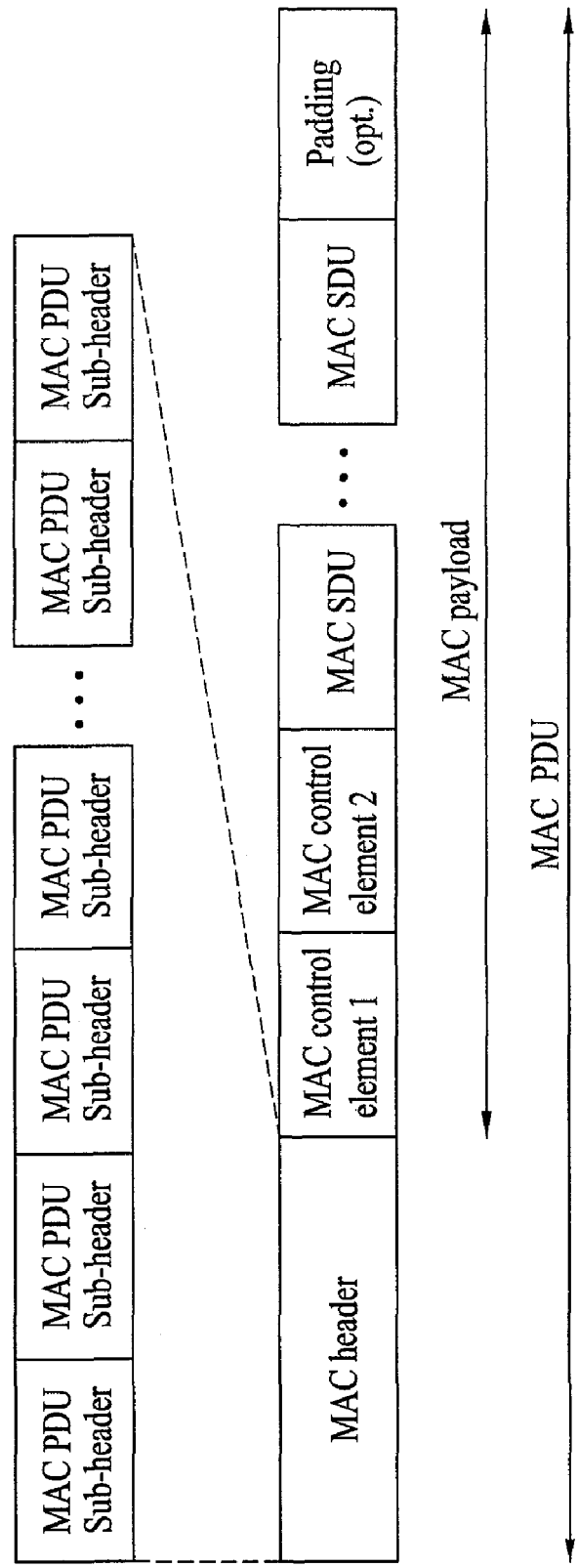
FIG. 5A to FIG. 5C are diagrams illustrating structures of MAC layer data blocks (MAC PDU) according to another embodiment of the present invention.
Figure 5B:
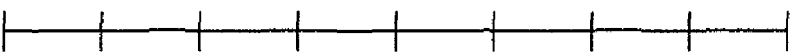
Figure 5C:
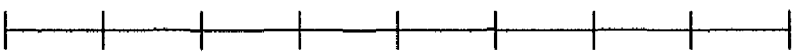

FIG. 5A to FIG. 5C illustrate a structure of MAC layer data block (MAC PDU) according to another embodiment of the present invention.

Referring to FIG. 5, MAC PDU includes a MAC header part and a MAC payload part. The MAC header part includes at least one sub-header, and the MAC payload part can selectively include MAC control element, MAC SDU, and a padding part. The sizes of the MAC SDU and the MAC header are variable.

Each sub-header included in the MAC header corresponds to the MAC control element, the MAC SDU, and the padding part included in the MAC payload part, and includes control information of the corresponding parts. The order of the sub-headers is identical with that of the corresponding MAC information element, the corresponding MAC SDU, and the corresponding padding part. A padding buffer status report (BSR) can be located at the end of the MAC PDU. The padding BSR includes location information for allowing a mobile station to report its buffer status to a base station. The padding part is located at the end of the MAC PDU. However, there is exception if padding of 1 byte or 2 byte is required but there is no space for 1 byte or 2 byte at the end of the MAC PDU. In this case, one or two MAC PDU sub-headers corresponding to the padding part are inserted in front of the first sub-header corresponding to the MAC SDU. If there is no first sub-header corresponding to the MAC SDU, one or two sub-headers corresponding to the padding part is inserted in front of the sub-header corresponding to the MAC control element.

FIG. 5B and FIG. 5C illustrate a structure of the MAC PDU sub-header corresponding to the MAC SDU in accordance with one embodiment of the present invention. FIG. 5B is identical with FIG. 5C except that a length of a length field (L) including length information of the MAC SDU is expressed by 7 bits in FIG. 5B while the length is expressed by 15 bits in FIG. 5C.

In FIG. 5B and FIG. 5C, the MAC PDU sub-header includes 'R' field, 'C' field, 'E' field, 'LCID' field, 'F' field, and 'L' field. The 'R' field is a reserved field, and the 'E' field is a field indicating whether another sub-header follows after a corresponding sub-header. The 'LCID' field includes information indicating a logical channel to which MAC SDU corresponding to the corresponding sub-header is transferred. Examples of the logical channel include BCCH (Broadcast Channel), PCCH (Paging Control Channel), CCCH (Common Control Channel), MCCH (Multicast Control Channel), and MTCH (Multicast Traffic Channel).

The 'C' field is a field which includes a length change indicator. The length change indicator indicates whether the length of the MAC SDU corresponding to the corresponding sub-header has been changed in comparison with the length of the MAC SDU included in the previous MAC PDU. The 'L' field includes information indicating the length of the MAC SDU corresponding to the corresponding sub-header, and is omitted if the length change indicator included in the 'C' field indicates that there is no change in the length of the corresponding MAC SDU.

If the length of the MAC SDU included in the previous MAC PDU is compared with that of the MAC SDU included in the current MAC PDU to determine the length change indicator to be included in the 'C' field, information included in the 'LCID' field is used. In other words, if a plurality of MAC SDUs are included in the previous MAC PDU, a length of a specific MAC SDU included in the current MAC PDU is compared with that of the MAC SDU transferred through the same logical channel to which the MAC SDU included in the current MAC PDU among the plurality of MAC SDUs included in the previous MAC PDU has been transferred, whereby it is determined whether the length of the specific MAC SDU included in the current MAC PDU has been changed.

AMR codec used in voice communication, i.e., voice data generated through voice codec is divided into a talk spurt and a silent period. The talk spurt means a voice data period generated while a person is actually talking, and the silent period means a voice data period generated while a person does not talk. For example, voice packets which include voice data in the talk spurt are generated per 20 ms, and silent packets (SID) which include voice data in the silent period are generated per 160 ms. In other words, since the voice data is characterized in that the same sized packets are generated at the same interval in the talk spurt or the silent period, if the embodiments of the present invention are applied to the voice data, a space for the length field for indicating length information of the corresponding MAC SDU per MAC PDU can be saved, whereby channel resources can be used efficiently. It will be apparent that the embodiments of the present invention can be applied to other services, for example, MBMS service, having a feature similar to that of the voice data, as well as voice data.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present, invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system such as a mobile communication system and a wireless Internet system.

The invention claimed is:
1. A method of configuring a lower layer data block in a protocol layer of a transmitting side in a wireless communication system, the method comprising:

receiving upper layer data from an upper layer; and configuring a second lower layer data block to include a first upper layer data block comprising at least part of the upper layer data, and a size change indictor indicating whether a size of the first upper layer data block is identical with a size of a second upper layer data block included in a first lower layer data block, wherein, if the size change indicator indicates that the size of the first upper layer data block is different from the size of the second upper layer data block, the second lower layer data block further includes a length field which indicates the size of the first upper layer data block.

2. The method of claim 1, wherein, if the size change indicator indicates that the size of the first upper layer data block is identical with the size of the second upper layer data block, the second lower layer data block does not include a length field which indicates the size of the first upper layer data block.

3. The method of claim 1, wherein the size change indicator is included in a header of the second lower layer data block.

4. The method of claim 1, wherein the size change indicator and the length field are included in a header of the second lower layer data block.

5. The method of claim 1, wherein the first upper layer data block and the second upper layer data block include upper layer data transferred from the upper layer through a single logical channel.

6. A method of generating a lower layer data block in a protocol layer of a transmitting side in a wireless communication system, the method comprising:

generating a first lower layer data block which includes a first upper layer data block, and a first length field indicating a size of the first upper layer data block; and generating a second lower layer data block which includes a second upper layer data block, and a size change indictor indicating whether a size of the second upper layer data block is identical with a size of the first upper layer data block, wherein, if the size change indicator indicates that the size of the first upper layer data block is different from the size of the second upper layer data block, the second lower layer data block further includes a length field which indicates the size of the second upper layer data block.

7. The method of claim 6, wherein, if the size change indicator indicates that the size of the first upper layer data block is identical with the size of the second upper layer data block, the second lower layer data block does not include a length field which indicates the size of the second upper layer data block.

8. The method of claim 6, wherein the size change indicator is included in a header of the second lower layer data block.

9. The method of claim 6, wherein the size change indicator and the length field are included in the header of the second lower layer data block.

10. The method of claim 6, wherein the first upper layer data block and the second upper layer data block include upper layer data transferred from the upper layer through an identical logical channel.

11. A method of transmitting data from a transmitting side of a wireless communication system to a receiving side, the method comprising:

transmitting a first lower layer data block to the receiving side, the first lower layer data block including a first upper layer data block and a first length field indicating a size of the first upper layer data block; and transmitting a second lower layer data block to the receiving side, the second lower layer data block including a second upper layer data block and a size change indictor indicating whether a size of the second upper layer data block is identical with a size of the first upper layer data block, wherein, if the size change indicator indicates that the size of the first upper layer data block is different from the size of the second upper layer data block, the second lower layer data block further includes a length field which indicates the size of the second upper layer data block.

* * * * *